United States Patent [19]

Haneda

[11] Patent Number: 4,846,556
[45] Date of Patent: Jul. 11, 1989

[54] COLOR FILTER AND METHOD OF MANUFACTURING THE SAME

[75] Inventor: Akio Haneda, Yookaichi, Japan

[73] Assignee: Toppan Printing Co., Ltd., Tokyo, Japan

[21] Appl. No.: 192,613

[22] Filed: May 11, 1988

[30] Foreign Application Priority Data

May 14, 1987 [JP] Japan ................. 62-117891

[51] Int. Cl.⁴ .......................... G02B 5/22; B05D 5/06; G03C 5/00
[52] U.S. Cl. .................................. 350/317; 350/320; 427/165; 427/166; 252/582; 430/321; 430/325
[58] Field of Search ............... 350/317, 320, 311; 427/162, 164, 165, 166, 168, 169; 252/582, 586; 430/7, 321, 325, 326, 329, 396

[56] References Cited

U.S. PATENT DOCUMENTS 4,386,143  5/1983  Sato et al. ................... 350/317
4,419,425 12/1983  Ogawa et al. ................ 430/7

FOREIGN PATENT DOCUMENTS 62-14422  1/1987  Japan .
564202    7/1975  Switzerland ............... 350/320

Primary Examiner—Bruce Y. Arnold
Assistant Examiner—Ronald M. Kachmarik
Attorney, Agent, or Firm—Bacon & Thomas

[57] ABSTRACT

A color filter useful for a color liquid crystal display device, wherein an opaque metal layer is used as a light-shielding layer, and formed on a transparent substrate in a matrix form. A black photoresist layer is left unremoved on the light-shielding layer and color filter layers are formed thereover to fill the matrix spaces of the light-shielding layer. A method of manufacturing such a color filter by means of photolithography is also disclosed.

6 Claims, 1 Drawing Sheet

COLOR FILTER AND METHOD OF MANUFACTURING THE SAME

BACKGROUND OF THE INVENTION

1. Field of the Invention

The present invention relates to a color filter used in a color liquid crystal display device or the like and a method of manufacturing the color filter.

2. Description of the Related Art

A color filter layer is formed on the inner surface of one of opposite glass substrates to prevent degradation of display quality in a conventional liquid crystal display device.

The conventional color filter layer is formed in the following manner. A solution of a hydrophilic resin such as a bichromate-sensitized gelatin, glue, casein or polyvinyl alcohol is applied to the entire surface of a transparent substrate such as a glass plate by spin coating. The resin layer is exposed with light according to mask exposure, thereby obtaining a predetermined pattern. The pattern is then developed to obtain a relief pattern. The relief pattern is dyed with an acidic dye of a desired color. Thereafter, a tannic acid aqueous solution and a tartar emetic aqueous solution are used to perform anti-dyeing. This operation is repeated by the number of colors to prepare a color filter portion. In addition, in order to improve display quality of the liquid crystal display device, a light-shielding black matrix pattern is formed at a boundary of adjacent colors before or after formation of the color filter. The matrix-like light-shielding pattern can be formed in the same manner as in the color filter portion. A relief pattern is formed by a photolithographic technique and is colored with a black dye to obtain the light-shielding pattern.

However, according to a method of forming a conventional color filter layer described above, all the light-shielding layer (black), and red, green, and blue portions are formed by photolithographic techniques. Therefore, the number of manufacturing steps is large, which is undesirable in terms of production efficiency. In addition, if a pinhole is formed in a mask, although very small, it causes an omission in the light-shielding layer or each color portion in an etching step. The omission has a size several times that of the actual pinhole to increase a large number of defective filters. Another problem is that each color is obtained by using an expensive organic dye, and the organic dyes are easily degraded by light or heat. In particular, since the light-shielding layer is dyed in black, a satisfactory light-shielding effect cannot be obtained.

SUMMARY OF THE INVENTION

The present invention has been made in consideration of the above situation, and has as its object to provide a color filter and a method of manufacturing the same, wherein a product yield can be increased with high quality and high productivity and cost can be reduced.

In order to achieve the above object of the present invention, an opaque metal layer is used as a light-shielding layer as a means for solving the above problems and is formed by a photographic technique. In addition, a photoresist film used in the photolithographic technique is left unremoved and a color filter portion is formed thereover.

More specifically, according to an aspect of the present invention, there is provided a color filter comprising a transparent substrate, a light-shielding layer of an opaque metal layer formed on one major surface of the substrate in a matrix form, a black photoresist layer left on the light-shielding layer, and red, green, and blue color filter portions formed so as to fill at least matrix spaces of the light-shielding layer.

According to another aspect of the present invention, there is provided a method of manufacturing a color filter, comprising the steps of: forming an opaque metal layer to entirely cover one major surface of a transparent substrate; forming a photoresist material layer containing a black coloring agent on an entire upper surface of the metal layer; processing the photoresist material layer according to a photolithographic technique to form a black photoresist layer having a predetermined matrix pattern; etching an exposed metal layer by using the photoresist layer as a mask, thereby forming a light-shielding layer; and sequentially forming red, green, and blue color filter portions between etched portions of the light-shielding layer.

According to the present invention, since the light-shielding layer comprises the opaque metal layer, the light-shielding properties can be improved.

Furthermore, the color filter portions are formed while the black photoresist layer used in the photolithographic process is left on the substrate. Therefore, even if the photoresist layer has a small pinhole and a large pinhole is formed in the metal layer underlying the photoresist layer, degradation of the light-shielding effect by the pinhole in the metal layer can be reduced to a substantially negligible degree by the light-shielding effect of the photoresist layer.

DETAILED DESCRIPTION OF THE PREFERRED EMBODIMENTS

The present invention will be described in detail with reference to the accompanying drawings.

Figure 1:
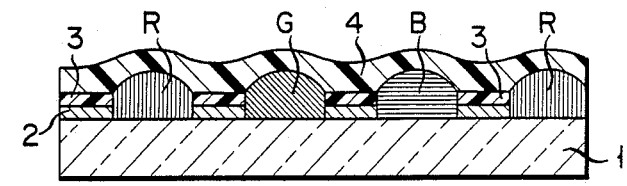
FIG. 1 is a sectional view showing a color filter according to the present invention.

FIG. 1 schematically illustrates a section of a color filter according to the present invention. The color filter comprises transparent substrate 1 consisting of, e.g., glass, light-shielding layer 2 of an opaque metal layer formed on one major surface of substrate 1 in a matrix form, red R, green G, and blue B color filter portions formed by printing so as to fill matrix spaces of light-shielding layer 2, and transparent protective layer 4 formed to entirely cover the color filter portions and light-shielding layer 2.

Photoresist layer 3 is very effective to shorten the process time and improve the light-shielding effect of light-shielding layer 2.

A method of manufacturing this color filter will be described below.

Figure 2:
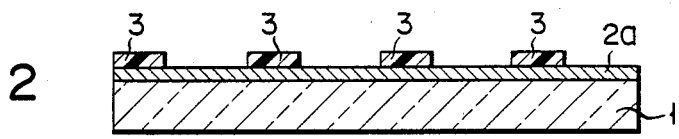
FIGS. 2 to 6 are sectional views showing steps in manufacturing the color filter according to the present invention.

As shown in FIG. 2, a metal such as Cr, Al, or Cu is used to form uniform opaque metal layer 2a having a thickness of, e.g., 500 to 2,000 μm on one entire major surface of transparent substrate 1 according to deposition, sputtering, or the like. A photoresist (e.g., OFRP (tradename) available from Tokyo Oyokagaku K.K.)

containing a black coloring agent is uniformly applied to the upper surface of opaque metal layer 2a by a spinner or a roll coater. The photoresist is dried, exposed with light by using a mask, and developed to form black photoresist layer 3 having a predetermined pattern.

Figure 3:
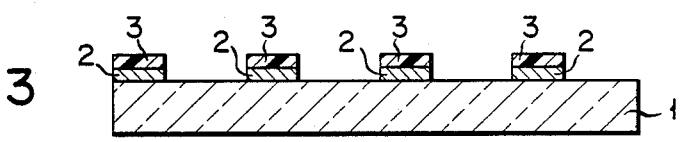

An exposed portion of metal layer 2a is etched using photoresist layer 3 as a mask to form light-shielding layer 2 having a matrix pattern, as shown in FIG. 3. Photoresist layer 3 is heat-treated at a temperature of 200° C. or higher so as to provide sufficient chemical resistance properties to photoresist layer 3.

Figure 4:
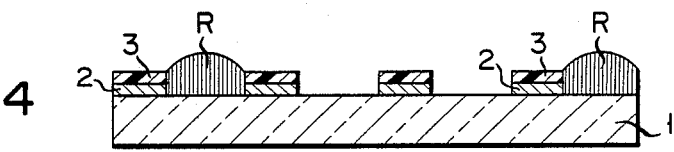

As shown in FIG. 4, a red pigment ink is filled in predetermined matrix spaces of light-shielding layer 2 according to printing such as offset printing or screen printing, thereby forming color filter portion R. In this case, color filter portion R is formed so as to fill at least the matrix spaces of light-shielding layer 2. In this case, slight misregistration may be allowed if the pigment does not overflow into portions of other colors. In other words, small positional errors can be neglected.

Figure 5:
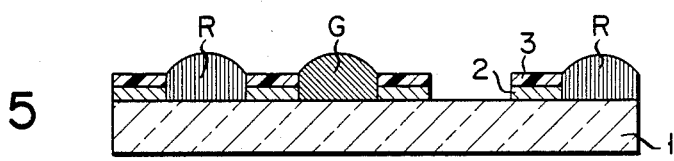
Figure 6:
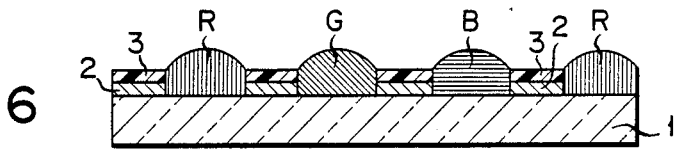

Similarly, predetermined portions are printed using green and blue pigment inks to form color filter portions G and B, as shown in FIGS. 5 and 6.

Finally, as shown in FIG. 1, transparent protective layer 4 of a transparent material such as an acrylic resin, an urethane resin, an epoxy resin, or a silicone resin is formed to cover the entire surface and flatten the surface, thereby preparing the color filter.

Figure 7:
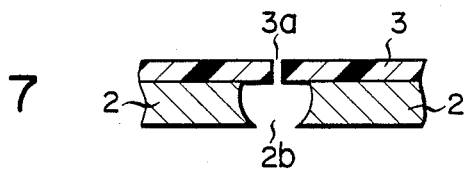
FIG. 7 is a sectional view showing part of the color filter.

According to the present invention, the metal layer is used as a light-shielding layer. Furthermore, the color filter portions are formed while black photoresist layer 3 used in the photolithographic process is left on the substrate. Therefore, even if photoresist layer 3 has small pinhole 3a and large pinhole 2b is formed in light-shielding layer 2 of a metal layer underlying photoresist layer 3, degradation of the light-shielding effect by large pinhole 2b in the metal layer can be substantially reduced to a negligible degree by the light-shielding effect of overlying photoresist layer 3. This is shown in the sectional view shown in FIG. 7. In addition, removal of photoresist layer 3 can be omitted, and manufacturing cost can be reduced.

Therefore, according to the present invention, there is provided a highly reliable, inexpensive color filter with high quality.

What is claimed is:

1. A color filter comprising a transparent substrate, a light-shielding layer of an opaque metal layer formed on one major surface of the substrate in a matrix form having opaque and open portions, a developed black photoresist layer on the opaque portions of the matrix, and red, green and blue color filter portions filling at least the open portions of the matrix of the light-shielding layer.

2. A filter according to claim 1, wherein the light-shielding layer is formed by a photolithographic technique.

3. A filter according to claim 1, wherein the opaque metal layer contains as a major constituent a metal selected from the group consisting of chromium, aluminum, and copper.

4. A filter according to claim 1, wherein a transparent protective layer is formed to entirely cover the light-shielding layer and the color filter portions.

5. A method of manufacturing a color filter, comprising the steps of: forming an opaque metal layer to cover one major surface of a transparent substrate; forming a photoresist material layer containing a black coloring agent on an entire upper surface of the metal layer; processing the photoresist material layer according to a photolithographic technique to form a black photoresist layer having a predetermined matrix pattern including open portions exposing portions of the opaque metal layer; etching the exposed portions of the metal layer by using the photoresist layer as a mask, thereby forming a light-shielding layer; and sequentially forming red, green, and blue color filter portions on the etched portions of the light-shielding layer to form the color filter.

6. A method according to claim 5, including the step of heat-treating the photoresist layer after the light-shielding layer is formed but prior to formation of the color filter portions, thereby providing chemical resistance properties to the photoresist layer.

* * * * *